Feb. 10, 1970 S. NYGAARD 3,494,697

DEVICE FOR MOUNTING AND SECURING OF A PICTURE MOUNTING FOR STEPWISE PRINTING OF PICTURES ON A SHEET

Filed Aug. 16, 1967

United States Patent Office 3,494,697
Patented Feb. 10, 1970

3,494,697

DEVICE FOR MOUNTING AND SECURING OF A PICTURE MOUNTING FOR STEPWISE PRINTING OF PICTURES ON A SHEET

Sven Nygaard, Dronningensgade 20, Nykobing Falster, Denmark

Filed Aug. 16, 1967, Ser. No. 661,077
Int. Cl. G03b 27/04, 27/42
U.S. Cl. 355—86 8 Claims

ABSTRACT OF THE DISCLOSURE

A device for mounting and securing of a picture mounting for stepwise multiple printing of pictures on a joint sheet, such as a photographic film, sensitized offset plant or printing plate. The device has a bottom plate along the edge of which is a slide in the form of a rule. The slide is displaceable in a groove parallel with the edge of the bottom plate. One of the plate edges is covered in part and secured in the groove by a transparent locking gauge. The slide also has a row of holes of equal size along the uncovered part of the surface. The holes are arranged with a spacing ($a$) parallel to the edge, to which holes the picture mounting is fixed in place by means of actual buttons provided with a cylindrical pin. The diameter of the pin corresponds exactly to the diameter of the holes in the slide. The slide is further provided with a second series of holes of number ($n$) which are equal in size and are located in a row along the part covered by the locking gauge. The transparent locking gauge has an equally large number ($n$) of holes of the same size which are in alignment with the row of holes in the covered portion of the slide. The spacing of the holes in the locking gauge is $a/n$ larger than the spacing of the holes in the lower row.

Figures 1, 2, 3:
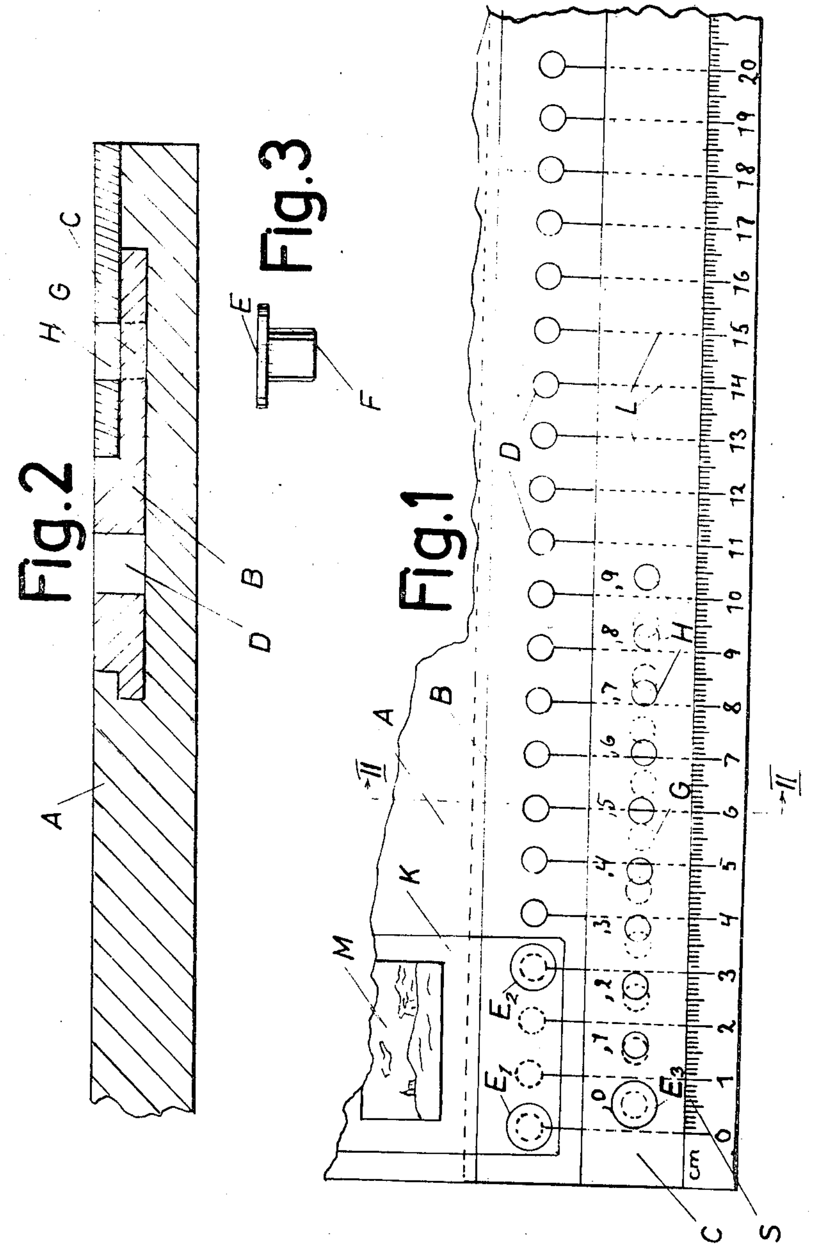

The setting is made by moving the picture mounting along the upper row and making the fine adjustment in the lower row.

The invention relates to a device for mounting and securing of a picture mounting for stepwise multiple printing on a joint sheet, for instance in the form of a photographic film or a sensitzed offset plate or printing plate.

A device is known for mounting of a picture mounting, for instance in the form of a transparency, in relation to a light-sensitive surface on to which the picture on the picture mounting is transferred by stepwise printing, the picture mounting being moved successively between the individual prints from one position to the next in accurately measured distance and direction, the said device consisting of a bottom plate provided at least along the edge of one side with an adjusting gauge with registering holes of equal size equidistantly spaced along the gauge, the positioning being effected by means of pin discs inserted in the registering holes, the said pin discs being provided on one side with pins for engagement with the said holes and provided on the other side with a pin offset at a certain ratio in relation to the aforesaid pins, the picture mounting being provided with fixing straps, which can be brought into engagement with selected pin discs in the registering holes, thus enabling a picture mounted on the picture mounting to be moved stepwise along at least one side of the adjusting device from pin disc to pin disc, causing the picture to be placed successively in accurately located positions on the bottom plate.

The object of the invention is to provide a device of the said type which is easier to operate than the devices known so far and which further affords a possibility of a larger number of spacing variations within the same production price for the device.

This is achieved by the device according to the invention which is characteristic in its consisting of a bottom plate A, along the edge of which a slide B in the form of a rule has been let in, which said side is displaceable in a groove parallel with the edge of the bottom plate A, and which along one edge is covered in part and secured in the groove by a transparent locking gauge C, the slide B being further provided along the uncovered part of the surface with a row of holes D of equal size, the said holes being arranged with the spacing $a$ and parallel with the edge, to which said holes the picture mounting K can be fixed in place by means of actually known buttons E provided with a cylindrical pin F, the diameter of which corresponds exactly to the diameter of the holes D in the slide B, which further provided with a number $n$ of holes G of equal size in a row along the part covered by the locking gauge C, the transparent locking gauge C being provided with an equally large number $n$ of holes of the same size H in alignment with the former row of holes G in the slide whereas, however, the spacing of the holes H in one of these rows covering each other is $a/n$ larger than the spacing of the holes G in the other row.

As a result of the fact that only a very small number of buttons of simple design are required, which may all of them be uniform, a considerable saving in production cost is achieved, and there will be no possibility of erroneous selection of locking buttons or incorrect positionings in inserting the buttons.

The possibilities of error are further reduced by the adjustment being effected in two separte stages, each of which is unambiguous and easily effected. Compared with devices provided with vernier the device can be made smaller and cheaper, seeing that the fine adjustment appliances are required only to be movable in relation to each other over a distance of one basic unit. And as a further result wear and tear will be at a minimum.

For reasons of production it is an advantage that all of the holes are of the same diameter, and for the same reason it is an advantage that the distance between the holes is the same in both of the rows of holes located in the slide.

To facilitate operation it is expedient to select a measuring unit used in practice for the distance between the holes in the slide, and for the same reason graduation marks can be provided according to the invention opposite each hole in the uncovered row of holes for reading of the distance from the zero point on a scale along the edge of the bottom plate, and the said scale may be subdivided in fractions of the unit of length used.

Further the holes in the transparent locking gauge may suitably be marked in accordance with the graduation selected.

The invention will be explained below in greater detail with reference to the drawing which shows an embodiment of the invention, FIG. 1 showing a corner of the device with the picture mounting fixed in its initial position, FIG. 2 being a section along the line II—II in FIG. 1, and FIG. 3 showing a locking button for insertion in one of the holes.

The device illustrated consists of a bottom plate A, in which a groove has been recessed, a slide B being fitted in the said groove so as to be movable exactly parallel with the edge of the bottom plate.

The slide B is provided with a continuous row of holes of equal size D, the spacing $a$ of which from centre to centre in the example shown is 1 cm. These holes are accurately aligned parallel with the edge of the bottom plate. Opposite each of these holes the slide is provided with graduation marks L referring to a scale S divided into cm. and subdivided in 1/10 cm.

The slide B is further provided with 10 holes G in a row parallel with the edge of the bottom plate A and with a spacing which may be different from the distance *a*, but which has been selected equal to *a* in the example shown. The diameter of these holes may be different from the diameter of the holes D, but in the drawing the holes are shown with the same diameter, and the arrangement has been selected for the holes G to be staggered ½*a* in relation to the holes D in the longitudinal direction of the row.

Along the edge of the bottom plate A on the upper side of the latter a locking gauge C of transparent material is provided, and this locking gauge is superjacent on the slide, so that the edge of the slide and the holes G provided in it are covered by the locking gauge, which prevents the slide B from being lifted out of its groove in the bottom plate A. Directly opposite the row of holes in the slide, the locking gauge C is provided with a row of 10 holes H, the diameter of which is equal to the diameter of the holes G, and the spacing of which is 1.1 cm., that is, 1/10 cm. larger than the spacing between the holes G in the slide. In the example, the holes H are marked with a legend on the locking gauge of the decimal which indicates the longitudinal displacement between corresponding holes in the two rows.

K is a picture mounting, which may consist of a transparent plastic foil, on which the picture M to be transferred through printing is secured by means of straps, for instance in the form of adhesive tape. The picture mounting K is kept in place in relation to the bottom plate by means of two buttons E, which are designed as principally circular discs, each provided with a cylindrical pin F, which fits accurately in the holes D in the slide.

The device is used in the following way.

The picture mounting K with the picture or pictures M mounted on it is secured by means of two buttons $E_1$ and $E_2$ to the slide B at the initial position by one button $E_1$ being inserted for instance in the hole D the graduation mark L of which points to 0 in the scale S. The other button $E_2$ is inserted in the hole D which is directly opposite the button $E_1$ in the strap. A third button $E_3$ is pressed through the hole marked 0 of the locking gauge and down into the first hole H in the slide C.

After the printing has been made in the conventional way, the buttons $E_1$ and $E_2$ are lifted out of their holes; the button $E_1$ is inserted in the hole D which corresponds to the required displacement measured in cm., and if the displacement is to be a whole number of cm., the button $E_3$ remains in its place in the hole marked 0. If the displacement is not to be a whole number of cm., but for instance 12.4 cm., the picture mounting K is fixed in place by the button $E_1$, being inserted in the hole D opposite the FIGURE 12 on the scale S, the button $E_2$ being inserted in the hole D opposite it on the same scale, and the button $E_3$ being lifted out of the hole marked 0 and inserted after the required displacement of the slide—approximately 0.4 cm.—in the hole marked 4 and, as it is pressed through into the subjacent hole G in the slide, the displacement will be so adjusted that the distance between the initial position of the picture mounting and the present position will be exactly 12.4 cm. At the same time the graduation mark opposite hole D No. 12 will point to the graduation of the scale opposite 12.4. That is, the graduation marks L will both make it easier to determine the displacement required and serve as a check on the correct adjustment.

The subsequent displacements are effected in entirely similar manner by simple addition of the value of the displacements required.

The invention is not limited to the example of the embodiment shown and explained above. For instance it would be practical for certain purposes to arrange the holes D and G with some other spacing than 1 cm. Further the bottom plate may be provided with slides along one, two, three, or all four edges, thus further enabling the displacement of the joint sheet itself at right angles to the direction of displacement of the picture mounting in similar manner as the displacement of the latter, which will also enable the spacing of the rows of pictures to be accurately fixed, and finally the slide and the locking gauge may be provided with several rows of holes corresponding to those dealt with above, but with different spacings, enabling adjustment of the slide according to any other graduations than tenths.

What I claim is:

1. Device for mounting and securing of a picture mounting for stepwise multiple printing of pictures on a joint sheet, for instance in the form of a photographic film or a sensitised offset plate or printing plate, characterised by its consisting of a bottom plate (A), along the edge of which a slide (B) in the form of a rule has been let in, which said slide is displaceable in a groove parallel with the edge of the bottom plate (A), and which along one edge is covered in part and secured in the groove by a transparent locking gauge (C), the slide (B) being further provided along the uncovered part of the surface with a row of holes (D) of equal size, the said holes being arranged with the spacing (*a*) and parallel with the edge, to which said holes the picture mounting (K) can be fixed in place by means of actually known buttons (E) provided with a cylindrical pin (F), the diameter of which corresponds exactly to the diameter of the holes (D) in the slide (B), which is further provided with a number (*n*) of holes (G) of equal size in a row along the part covered by the locking gauge (C), the transparent locking gauge (C) being provided with an equally large number (*n*) of holes of the same size (H) in alignment with the former row of holes (G) in the slide whereas, however, the spacing of the holes (H) in one of these rows covering each other is $a/n$ larger than the spacing of the holes (G) in the other row.

2. Device according to claim 1, characterised by the holes (D, H, and G) in the individual rows of holes being equidistant.

3. Device according to claim 2, characterised by all of the holes having the same diameter.

4. Device according to claim 1, characterised by the spacing of the holes in both of the rows of holes arranged in the slide being identical.

5. Device according to claim 4, characterised by the distance (*a*) being a measuring unit used in practice.

6. Device according to claim 5, characterised by graduation marks (L) being placed opposite each hole (D) of the uncovered row of holes for reading of the distance of the hole from the zero point on a scale (S) along the edge of the bottom plate.

7. Device according to claim 6, characterised by the scale being subdivided in fractions of the unit of length.

8. Device according to claim 7, characterised by the holes (H) in the transparent locking gauge being marked in accordance with the subdivision chosen.

References Cited

UNITED STATES PATENTS

| | | | |
|---|---|---|---|
| 2,049,557 | 8/1936 | Cooper et al. | 355—86 |
| 2,348,457 | 5/1944 | Drehs | 355—53 |

NORTON ANSHER, Primary Examiner

R. L. MOSES, Assistant Examiner

U.S. Cl. X.R.

355—53